United States Patent
Chelarescu et al.

(10) Patent No.: US 10,769,278 B2
(45) Date of Patent: Sep. 8, 2020

(54) SERVICE IDENTIFICATION OF RANSOMWARE IMPACT AT ACCOUNT LEVEL

(71) Applicant: Microsoft Technology Licensing, LLC, Redmond, WA (US)

(72) Inventors: Filip Chelarescu, Kirkland, WA (US); Parthipan Thayanithy, Redmond, WA (US); Meir E. Abergel, Redmond, WA (US); John D Rodrigues, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 244 days.

(21) Appl. No.: 15/941,243

(22) Filed: Mar. 30, 2018

(65) Prior Publication Data
US 2019/0303573 A1   Oct. 3, 2019

(51) Int. Cl.
*H04L 29/06* (2006.01)
*G06F 21/56* (2013.01)
(Continued)

(52) U.S. Cl.
CPC ............ *G06F 21/566* (2013.01); *G06F 16/16* (2019.01); *G06F 16/2358* (2019.01);
(Continued)

(58) Field of Classification Search
CPC ...... G06F 21/566; G06F 21/568; G06F 21/56; G06F 21/554; G06F 21/552;
(Continued)

(56) References Cited

U.S. PATENT DOCUMENTS

| 7,624,443 B2 | 11/2009 | Kramer et al. |
| 7,756,834 B2 | 7/2010 | Masters et al. |

(Continued)

FOREIGN PATENT DOCUMENTS

| CN | 106570396 A | 4/2017 |
| WO | 2017053745 A1 | 3/2017 |
| WO | 2018004891 A1 | 1/2018 |

OTHER PUBLICATIONS

"International Search Report and Written Opinion Issued in PCT Patent Application No. PCT/US19/023770", dated Jun. 25, 2019, 10 Pages.

(Continued)

*Primary Examiner* — Nelson S. Giddins
(74) *Attorney, Agent, or Firm* — Schwegman Lundberg & Woessner, P.A.

(57) ABSTRACT

A cloud storage server determines features of files in a storage account of the cloud storage server. The storage account is registered with a client device. The cloud storage server detects ransomware activity based on the features of the files. A notification is generated to the client device. The notification indicates the detected ransomware activity in the storage account, and one or more remediation options for the detected ransomware activity in the storage account. The cloud storage server receives, from the client device, a remediation option selected from the one or more remediation options and recovers one or more files in the storage account based on the selected remediation option.

20 Claims, 8 Drawing Sheets

(51) Int. Cl.
  *G06F 21/55*  (2013.01)
  *G06F 16/23*  (2019.01)
  *G06N 20/00*  (2019.01)
  *G06F 16/16*  (2019.01)

(52) U.S. Cl.
  CPC .......... *G06F 21/552* (2013.01); *G06F 21/554* (2013.01); *G06F 21/56* (2013.01); *G06F 21/565* (2013.01); *G06F 21/568* (2013.01); *G06N 20/00* (2019.01); *H04L 63/14* (2013.01); *H04L 63/1416* (2013.01); *H04L 63/1441* (2013.01)

(58) Field of Classification Search
  CPC .... G06F 21/565; G06F 16/2358; G06F 16/16; H04L 63/14; H04L 63/1441; H04L 63/1416; G06N 20/00
  See application file for complete search history.

(56) References Cited

U.S. PATENT DOCUMENTS

| | | | |
|---|---|---|---|
| 7,784,098 | B1 | 8/2010 | Fan et al. |
| 8,468,604 | B2 | 6/2013 | Claudatos et al. |
| 8,484,737 | B1 | 7/2013 | Swift et al. |
| 8,667,583 | B2 | 3/2014 | Polyakov et al. |
| 8,813,222 | B1 | 8/2014 | Codreanu et al. |
| 8,875,294 | B2 | 10/2014 | Golavanov |
| 8,881,282 | B1 | 11/2014 | Aziz et al. |
| 9,317,686 | B1 | 4/2016 | Ye et al. |
| 9,405,902 | B1 | 8/2016 | Xavier |
| 9,411,955 | B2 | 8/2016 | Jakobsson |
| 9,514,309 | B1 | 12/2016 | Mann |
| 9,680,845 | B2 | 6/2017 | Langton et al. |
| 9,734,337 | B1 | 8/2017 | Patton et al. |
| 9,756,061 | B1 | 9/2017 | Roeh et al. |
| 9,792,436 | B1 | 10/2017 | Sankruthi |
| 9,838,405 | B1 | 12/2017 | Guo et al. |
| 9,852,289 | B1 | 12/2017 | Mann |
| 10,007,795 | B1 | 6/2018 | Chung et al. |
| 10,009,360 | B1 | 6/2018 | Todd et al. |
| 10,055,582 | B1 | 8/2018 | Weaver et al. |
| 10,140,454 | B1 | 11/2018 | Spath et al. |
| 10,409,986 | B1 | 9/2019 | Nantanzon et al. |
| 2006/0137010 | A1 | 6/2006 | Kramer et al. |
| 2007/0006304 | A1 | 1/2007 | Kramer et al. |
| 2011/0082838 | A1 | 4/2011 | Niemela |
| 2012/0124007 | A1 | 5/2012 | Sten et al. |
| 2013/0024435 | A1 | 1/2013 | Poirier et al. |
| 2013/0067576 | A1 | 3/2013 | Niemela |
| 2013/0086683 | A1 | 4/2013 | Thomas et al. |
| 2014/0047544 | A1 | 2/2014 | Jakobsson |
| 2014/0130161 | A1 | 5/2014 | Golovanov |
| 2015/0172304 | A1 | 6/2015 | Kleczynski |
| 2015/0178171 | A1 | 6/2015 | Bish et al. |
| 2016/0124665 | A1 | 5/2016 | Jain et al. |
| 2016/0164894 | A1 | 6/2016 | Zeitlin et al. |
| 2016/0294851 | A1 | 10/2016 | Langton et al. |
| 2017/0140156 | A1 | 5/2017 | Gu et al. |
| 2017/0177867 | A1 | 6/2017 | Crofton et al. |
| 2017/0180394 | A1* | 6/2017 | Crofton ................ H04L 63/145 |
| 2017/0206353 | A1* | 7/2017 | Jai ........................ G06F 21/565 |
| 2017/0223031 | A1* | 8/2017 | Gu ...................... H04L 63/1416 |
| 2017/0270293 | A1 | 9/2017 | Gu et al. |
| 2017/0324755 | A1 | 11/2017 | Dekel et al. |
| 2017/0329965 | A1 | 11/2017 | Dodson |
| 2017/0364681 | A1 | 12/2017 | Roguine et al. |
| 2017/0371547 | A1 | 12/2017 | Fruchtman et al. |
| 2018/0007069 | A1 | 1/2018 | Hunt et al. |
| 2018/0018458 | A1 | 1/2018 | Schmugar et al. |
| 2018/0024893 | A1 | 1/2018 | Sella et al. |
| 2018/0027009 | A1 | 1/2018 | Santos et al. |
| 2018/0034835 | A1* | 2/2018 | Iwanir ................ H04L 63/1416 |
| 2018/0048658 | A1 | 2/2018 | Hittel et al. |
| 2018/0101678 | A1 | 4/2018 | Rosa |
| 2018/0181761 | A1 | 6/2018 | Sinha et al. |
| 2018/0203997 | A1 | 7/2018 | Charters et al. |
| 2018/0211038 | A1 | 7/2018 | Breiman et al. |
| 2018/0248896 | A1 | 8/2018 | Challita et al. |
| 2018/0293379 | A1 | 10/2018 | Dahan |
| 2018/0357133 | A1 | 12/2018 | Strogov et al. |
| 2018/0375826 | A1 | 12/2018 | Chang et al. |
| 2019/0065745 | A1 | 2/2019 | Araujo et al. |
| 2019/0109870 | A1* | 4/2019 | Bedhapudi .......... G06F 16/1734 |
| 2019/0130097 | A1 | 5/2019 | Berler et al. |
| 2019/0138727 | A1 | 5/2019 | Dontov et al. |
| 2019/0158512 | A1* | 5/2019 | Zhang .................. G06F 21/566 |
| 2019/0201597 | A1 | 7/2019 | Shelton et al. |
| 2019/0228148 | A1 | 7/2019 | Pohl et al. |
| 2019/0303571 | A1 | 10/2019 | Chelarescu et al. |
| 2019/0303572 | A1 | 10/2019 | Chelarescu et al. |
| 2019/0303575 | A1 | 10/2019 | Chelarescu et al. |
| 2019/0306179 | A1 | 10/2019 | Chelarescu et al. |
| 2019/0347419 | A1 | 11/2019 | Geng |

OTHER PUBLICATIONS

"International Search Report and Written Opinion Issued in PCT Patent Application No. PCT/US19/023771", dated Jun. 25, 2019, 10 Pages.

"International Search Report and Written Opinion Issued in PCT Patent Application No. PCT/US19/023775", dated Jun. 25, 2019, 10 Pages.

"Data Backup and recovery", Retrieved from <<https://www.pcrisk.com/how-to-remove-spyware/data-backup-and-recovery>>, Retrieved on Feb. 5, 2018, 6 Pages.

"Client Server Security", Retrieved from: http://docs.trendmicro.com/all/smb/css/v3.6/en-us/css_3.6_gsg.pdf, Mar. 2007, 93 Pages.

"International Search Report and Written Opinion Issued in PCT Application No. PCT/US2019/023776", dated May 14, 2019, 13 Pages.

"Eset vs. Crypto-ransomware", In White Paper of ESET, Retrieved on: Feb. 7, 2018, 9 Pages.

"File Type Detection and Filtration Overview", Retrieved from: https://onlinehelp.opswat.com/corev3/2.4.4._File_Type_Detection_And_Filtration_Overview.html, Retrieved Date: Feb. 5, 2018, 3 Pages.

"Nextcloud presents Ransomware Protection app", Retrieved from: https://help.nextcloud.com/t/nextcloud-presents-ransomware-protection-app/19255, Aug. 8, 2017, 6 Pages.

D-Souza-Wiltshire, et al., "Configure the notifications that appear on endpoints", Retrieved from: https://docs.microsoft.com/en-us/windows/threat-protection/windows-defender-antivirus/configure-notifications-windows-defender-antivirus, Oct. 31, 2017, 5 Pages.

Hatem, et al., "Malware Detection in Cloud Computing", In Journal of International Journal of Advanced Computer Science and Applications, vol. 5, Issue 4, 2014, pp. 187-192.

Muthurajkumar, et al., "Agent Based Intelligent Approach for the Malware Detection for Infected Cloud Data Storage Files", In Proceedings of Seventh International Conference on Advanced Computing, Dec. 15, 2015, pp. 1-5.

"International Search Report and Written Opinion Issued in PCT Application No. PCT/US2019/023772", dated May 7, 2019, 12 Pages.

"Non Final Office Action Issued in U.S. Appl. No. 15/941,710", dated Mar. 6, 2020, 14 Pages.

"Non Final Office Action Issued in U.S. Appl. No. 15/941,840", dated Mar. 4, 2020, 14 Pages.

"Non Final Office Action Issued in U.S. Appl. No. 15/942,009", dated Apr. 29, 2020, 22 Pages.

* cited by examiner

SERVICE IDENTIFICATION OF RANSOMWARE IMPACT AT ACCOUNT LEVEL

TECHNICAL FIELD

The subject matter disclosed herein generally relates to a special-purpose machine that detects ransomware-impacted files in a storage account of a cloud storage system and improves the detection of ransomware-impacted files in the storage account, including computerized variants of such special-purpose machines and improvements to such variants, and to the technologies by which such special-purpose machines become improved compared to other special-purpose machines that detect ransomware. Specifically, the present disclosure addresses systems and methods that detect a ransomware-impacted account in a cloud storage system and provide recovery options.

BACKGROUND

Conventionally, a ransomware attack on a computer modifies some files stored on the computer by encrypting the content of the files and holding the encrypted files for ransom. A user of the computer may not have other recourse to recover the encrypted files besides paying the ransom. If the ransom is not paid within a specified time, the files are permanently lost.

BRIEF DESCRIPTION OF THE DRAWINGS

Some embodiments are illustrated by way of example and not limitation in the figures of the accompanying drawings.

DETAILED DESCRIPTION

Figure 1:
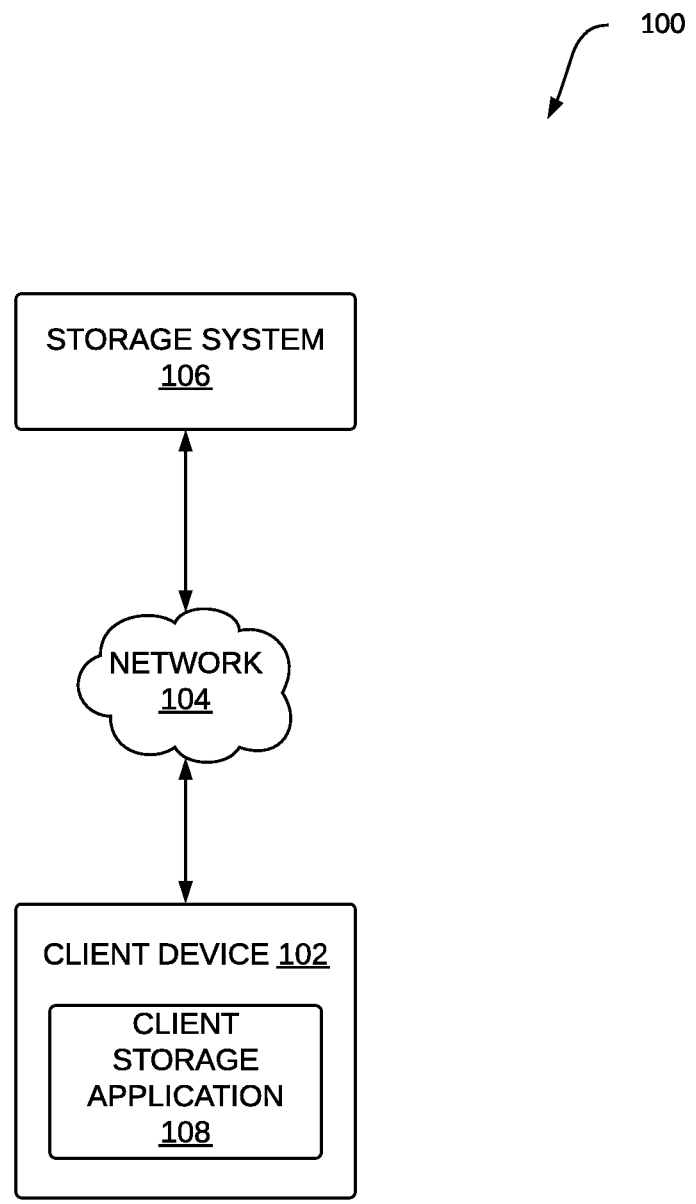
FIG. 1 is a block diagram illustrating an example environment for detecting ransomware-impacted files in accordance with an example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) and systems (e.g., special-purpose machines) detect a ransomware-impacted storage account in a cloud storage system and improve the ransomware detection using feedback from users of the cloud storage system. The files stored in the storage account at the cloud storage system (also referred to as cloud storage server) are synced to a drive or folder at a corresponding client device registered with the cloud storage server. In another example embodiment, the files are stored only in the storage account in the cloud storage server (and not at the corresponding client device). The cloud storage system performs a series of tests on the files in the storage account to determine whether the storage account is compromised by ransomware activity. Examples of tests include computing a file churn based on changes to one or more files in the storage account within a predefined period of time, computing a number of files being encrypted within the predefined period of time, identifying a name extension and a naming pattern for the one or more files in the storage account, identifying a content type for the one or more files in the storage account, accessing results from anti-malware applications operating on the client device, and using machine learning based on user feedback to determine whether the files are impacted by ransomware. Once the cloud storage server determines that the storage account is compromised by ransomware, the cloud storage server notifies the corresponding client device and presents an option to the client device to remediate the ransomware attack by restoring the impacted files to a previous (non-impacted) version of the files prior to the ransomware attack.

In accordance with example embodiments, a cloud storage server determines features of files in a storage account of the cloud storage server. The storage account is registered with a client device. The cloud storage server detects ransomware activity based on the features of the files. A notification is generated to the client device. The notification indicates the detected ransomware activity in the storage account, and one or more remediation options for the detected ransomware activity in the storage account. The cloud storage server receives, from the client device, a remediation option selected from the one or more remediation options and recovers one or more files in the storage account based on the selected remediation option.

As a result, one or more of the methodologies described herein facilitate solving the technical problem of identifying storage accounts (in a cloud storage server) that are affected by ransomware and providing remediation options to the client device. As such, one or more of the methodologies described herein may obviate a need for certain efforts or computing resources that otherwise would be involved in preventing an attack and generating false positives of ransomware detection in any of the files. As a result, resources used by one or more machines, databases, or devices (e.g., within the cloud storage system) may be reduced. Examples of such computing resources include processor cycles, network traffic, memory usage, data storage capacity, power consumption, network bandwidth, and cooling capacity.

For example, the present application minimizes any disruption to the user's workflow. If there are uninfected devices connected to cloud storage, these devices can sync their files without interruption. If the present detection is wrong, the user can ignore it. There is no added latency to file writes because the detection is asynchronous (i.e. because the file changes are permitted to occur).

In another example, because file changes are allowed as opposed to blocked, the cloud storage server receives a larger set of changes which may be malicious. The extra data, potentially in conjunction with user feedback, makes the malware detection more effective.

In yet another example, because the presently described detection is asynchronous, the detection can be executed using fewer system resources than a synchronous detection, thus making it less expensive.

FIG. 1 is a block diagram illustrating an example environment 100 for detecting ransomware-impacted files in accordance with an example embodiment. In example embodiments, a storage system 106 stores copies of files from a client device 102. The storage system 106 will be discussed in more detail in connection with FIG. 2 below.

The storage system 106 is coupled, via a network 104, to one or more client devices (e.g., the client device 102). One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The client device 102 includes a client storage application 108 configured to communicate files (e.g., send and receive copies of files) or modifications to the files with a storage account of the client device 102 at the storage system 106. For example, the client storage application 108 syncs local files stored in a preset directory or folder at the client device 102 with files stored in a corresponding directory or folder of the storage account at the storage system 106. Therefore, changes made to a local file in the preset folder of the client device 102 are propagated to a corresponding remote file (a copy of the local file) at the storage system 106. In one example, the client storage application 108 registers the client device 102 with the storage system 106 and communicates copies of the user-selected local files at the client device 102 to the storage system 106. In another example, changes made to a remote file at the storage system 106 are propagated to a corresponding local file at the client device 102.

In one example embodiment, the storage system 106 detects whether the storage account of the client device 102 (or the client storage application 108) at the storage system 106 is impacted (also referred to as "infected") by ransomware (or malware). The storage system 106 generates a notification to the client storage application 108 that the storage account has been impacted by ransomware and provides remediation options to the client device 102. In another example embodiment, the storage system 106 receives user feedback (e.g., validation/confirmation) from the client storage application 108 that provides additional reference data to a learning engine of the storage system 106 to increase its accuracy in detecting future ransomware activity at the storage system 106 and avoiding false positives.

The client device 102 comprises, but is not limited to, a smartphone, tablet, laptop, multi-processor system, microprocessor-based or programmable consumer electronics system, game console, set-top box, or any other device that a user utilizes to communicate over the network 104. In example embodiments, the client device 102 comprises a display module (not shown) to display information (e.g., in the form of specially configured user interfaces). In some embodiments, the client device 102 may comprise one or more of a touch screen, camera, keyboard, microphone, and Global Positioning System (GPS) device.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client devices 102 may be embodied within the environment 100. Furthermore, some components or functions of the environment 100 may be combined or located elsewhere in the environment 100. For example, some of the functions of the client storage application 108 may be embodied at the storage system 106.

Figure 2:
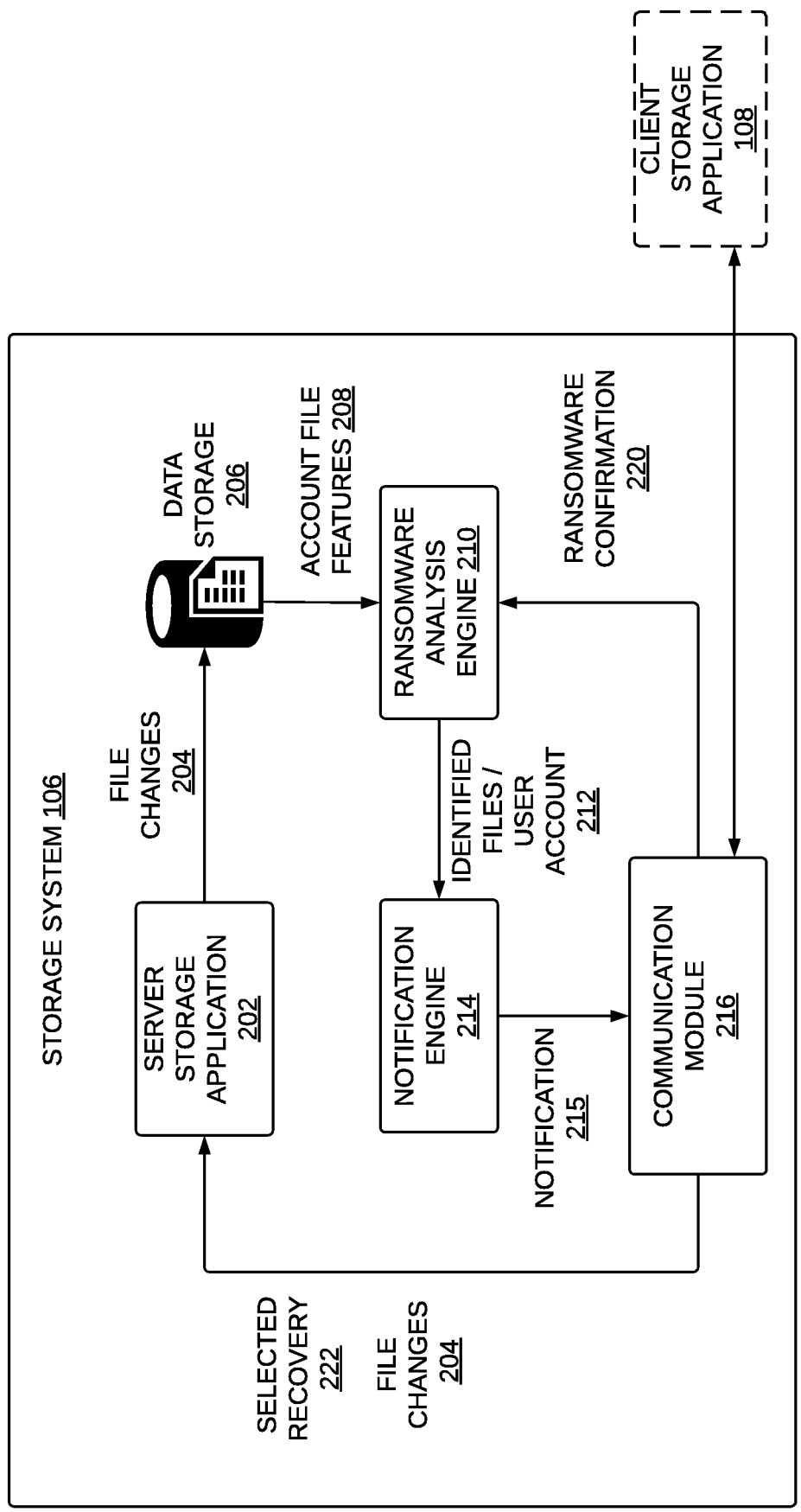
FIG. 2 is a block diagram illustrating components within a storage system in accordance with an example embodiment.

FIG. 2 is a block diagram illustrating components within a storage system 106 in accordance with an example embodiment. In example embodiments, the storage system 106 performs operations to detect and identify storage accounts impacted by ransomware, generates a notification of the ransomware attack to a client device corresponding to the storage account impacted by the ransomware attack, provides remediation options to the client device, receives a recovery selection from the client device, and operates on the storage account based on the recovery selection. To enable these operations, the storage system 106 comprises a server storage application 202, a data storage 206, a ransomware analysis engine 210, a notification engine 214, and a communication module 216, all of which are configured to communicate with each other (e.g., over a bus, shared memory, or a switch) in accordance with an example embodiment.

The server storage application 202 is configured to interface and communicate with the communication module 216. The server storage application 202 receives a request to modify the storage account at the data storage 206 from the client storage application 108. The server storage application 202 may also receive a request from the client storage application 108 to add a new file in the data storage 206 or to replace an existing corresponding file with a modified file in the data storage 206.

In other example embodiments, the server storage application 202 receives and sends copies of files between the storage system 106 and the client device 102. In one example, the server storage application 202 is configured with the client storage application 108 to store one or more versions of copies of files received from the client storage application 108 at the storage account associated with the client storage application 108. For example, the server storage application 202 registers the client storage application 108 and forms a folder or a directory (that corresponds to a user-selected folder or directory at the client device 102) associated with the storage account of the client device 102 at the storage system 106. Therefore, any changes to a file in the folder at the client device 102 are replicated to the corresponding file in the corresponding folder at the storage account in the storage system 106. In another example embodiment, the server storage application 202 identifies historical changes to a file stored at the storage system 106 based on the different versions of the file received from the client storage application 108. The server storage application 202 stores file changes 204 (e.g., a new file or a modified file) in the storage account of the client storage application 108 at the data storage 206.

The data storage 206 is configured to store the files (e.g., file changes 204) received from the server storage application 202. In one example, the data storage 206 is configured to store several versions of the files based on the dates and times of the different versions of the files. The files may include attributes such as file name, file extension, and size. Those of ordinary skill in the art will recognize that the files can include other different types of attributes.

In example embodiments, the data storage 206 is configured to store files and account information for individual users/storage accounts in user-specific data stores (or storage account-specific data stores) or databases (hereinafter collectively referred to as a "user data structure"). For instance, each user data structure may correspond to a folder and/or a directory of the client device 102 of a user. While the data storage 206 is shown to be a part of the storage system 106, in some embodiments, the data storage 206 may be located elsewhere in the environment 100 and be communicatively coupled to the storage system 106. Additionally, any number of data storages 206 may be used to store the user data structures.

In example embodiments, the data storage 206 provides account file features 208 of one or more files in the storage account of the client device 102 to the ransomware analysis engine 210. In another example embodiment, the data storage 206 provides copies of one or more files (or all files) associated with the storage account of the client device 102 to the ransomware analysis engine 210.

The ransomware analysis engine 210 performs a series of tests on the storage account (e.g., on one or more files in the storage account or using the account file features 208) to detect whether the storage account is impacted by ransomware. The ransomware analysis engine 210 will be discussed in more detail in connection with FIG. 3 below. Once the ransomware analysis engine 210 determines that the storage account is impacted by ransomware, the ransomware analysis engine 210 provides an identification of the storage account and the suspicious files in that storage account (e.g., identified files/user account 212) to the notification engine 214.

The notification engine 214 identifies the client storage application 108 associated with the ransomware-compromised storage account and generates a notification 215 that notifies the client storage application 108 that the storage account and the identified files are impacted by ransomware. In one example embodiment, the notification 215 includes a request for the client storage application 108 to confirm that the storage account and the identified files (at the data storage 206) are indeed impacted by ransomware. In another example embodiment, the notification 215 includes remediation options for the client storage application 108. The remediation options include several ways to address the ransomware attack such as restoring the ransomware-impacted files in the storage account to a previous version of the ransomware-impacted files.

In another example embodiment, the notification 215 includes, for example, an identification of the storage account and the suspicious files, a time of the suspected infection, a version identification of the suspicious files, an identification of who last modified the suspicious files, and an identification of the name of the suspected ransomware (or malware). The notification engine 214 provides the notification 215 to the communication module 216.

The communication module 216 is configured to exchange communications with the client device 102. For example, the communication module 216 transmits the notification 215 to the client storage application 108. In one example embodiment, the communication module 216 receives a ransomware confirmation 220 from the client storage application 108. The ransomware confirmation indicates whether a user (of the storage account) confirms that the storage account is indeed impacted by ransomware. The communication module 216 forwards the user feedback (e.g., the ransomware confirmation 220) to the ransomware analysis engine 210. In another example embodiment, the communication module 216 receives a selected recovery 222 (selected from the remediation options) from the client storage application 108 and communicates the selected recovery 222 to the server storage application 202. The server storage application 202 restores the storage account based on the selected recovery 222 (e.g., restoring the files to a previous version, deleting some of the files, restoring the files based on a non-impacted file in a recycle bin of the storage account).

In other example embodiments, the communication module 216 includes a user interface module (not shown) that is configured to cause presentation of specially configured user interfaces on the client device 102 that include a visual indication of the ransomware-impacted storage account, the impacted files, and other pertinent information (e.g., time of infection, last modified author, size change). The user interface module generates and transmits instructions to the client storage application 108 to render and display the user interfaces.

Any one or more of the components (e.g., modules, engines) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that component. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. The storage system 106 may comprise other components not pertinent to example embodiments that are not shown or discussed. Further still, one or more of the components of the storage system 106 may be located at one or more of the client devices.

Figure 3:
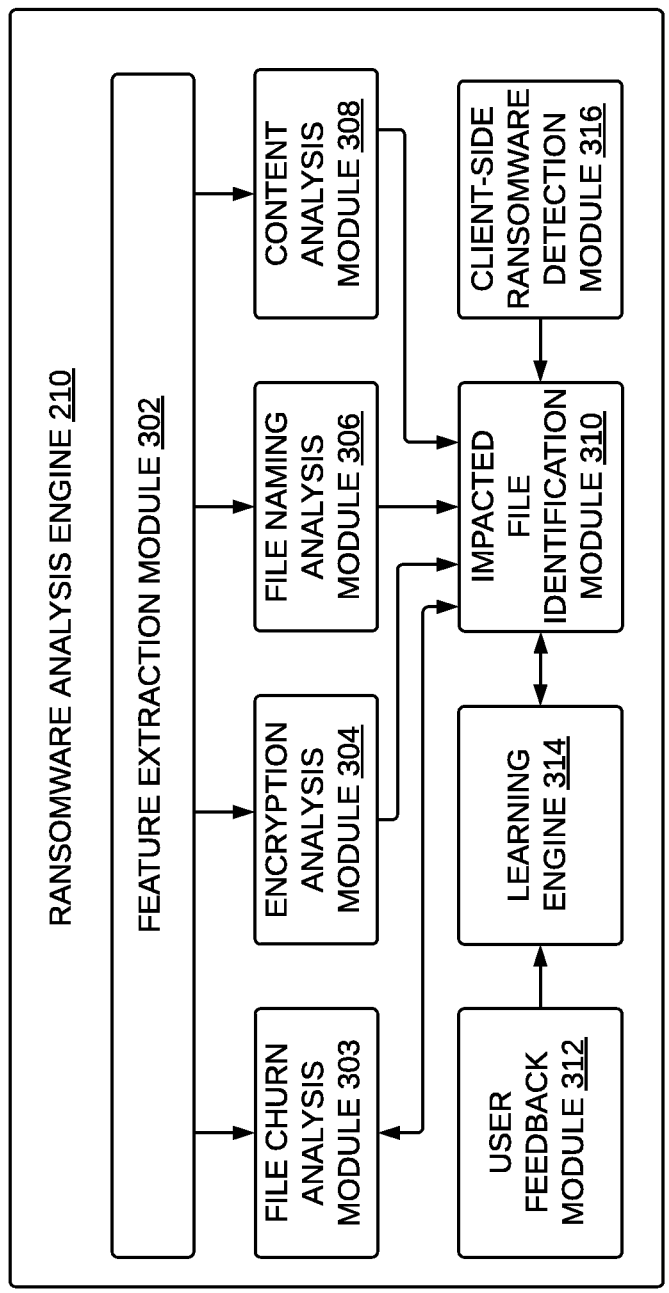
FIG. 3 is a block diagram illustrating components within a ransomware analysis engine in accordance with an example embodiment.

FIG. 3 is a block diagram illustrating components within a ransomware analysis engine 210 in accordance with an example embodiment. The ransomware analysis engine 210 performs operations to detect and identify ransomware-impacted files stored in the data storage 206. To enable these operations, the ransomware analysis engine 210 comprises a feature extraction module 302, a file churn analysis module 303, an encryption analysis module 304, a file naming analysis module 306, a content analysis module 308, a user feedback module 312, a learning engine 314, an impacted file identification module 310, and a client-side ransomware detection module 316, all of which are configured to communicate with each other (e.g., over a bus, shared memory, or a switch) in accordance with an example embodiment.

The feature extraction module 302 extracts features from files in the storage account at the data storage 206. In one example, the feature extraction module 302 extracts features from a last modified file or a new file received from the client storage application 108 via the server storage application 202. Examples of features (also referred to as "attributes" or "properties" in the present document) include, but are not limited to, attributes of the files such as file encryption status, name extension, date of creation, date of modification, versioning number, author name, type of media, and compression status.

The file churn analysis module 303 calculates a file churn as the number of files that have been modified during a predefined period of time (e.g., during the last 24 hours), as a raw number (e.g., 100 files have changed) or as a percentage of the account size (e.g., 5% of the files in the storage account have changed). The file churn analysis module 303 provides the file churn of the files of the storage account to the impacted file identification module 310.

The encryption analysis module 304 determines the encryption status of the files in the storage account based on the extracted features of the files. For example, the encryption analysis module 304 determines that the encryption status of the modified files have changed (e.g., from unencrypted to encrypted: a modified file is now encrypted whereas a previous version of the corresponding file is unencrypted). In another example, the encryption analysis module 304 determines that a new file is encrypted. The encryption analysis module 304 provides the encryption status of the files to the impacted file identification module 310.

The file naming analysis module 306 determines the names and the name extensions of the files based on the extracted features of the files in the storage account. For example, the file naming analysis module 306 compares the name of one of the files with the name of known ransomware. In another example embodiment, the file naming analysis module 306 determines whether there is an increase in file renames in the storage account. In other example embodiments, the file naming analysis module 306 monitors for text strings associated with known ransomware. The file naming analysis module 306 provides the results of its analysis to the impacted file identification module 310.

The content analysis module 308 determines whether content of a file from the storage account does not match its corresponding file type (e.g., based on its name extension). For example, the content analysis module 308 determines that the content in a .jpg file is not an image. The content analysis module 308 provides its content analysis result of the files of the storage account to the impacted file identification module 310.

The user feedback module 312 is configured to receive feedback (e.g., confirmation of the presence of ransomware in the storage account) from the client storage application 108 of the client device 102. For example, the user feedback module 312 receives a ransomware confirmation from the client storage application 108 based on user feedback at the client storage application 108. The user feedback indicates whether one or more files of the storage account (or whether the storage account) are indeed impacted by ransomware. The user feedback module 312 provides the user feedback (e.g., ransomware confirmation) to the learning engine 314.

The learning engine 314 (e.g., a machine learning algorithm) manages a learning model for identifying ransomware files. The learning engine 314 accesses file information (associated with the client device 102 and other client devices) from the data storage 206. The file information includes attributes, extensions, and features (including user feedback) of old, new, and modified files associated with the client device 102 and other client devices. Using the file information, the learning engine 314 can identify trends or patterns. For example, the learning engine 314 learns, based on file extensions, that the new file is actually not related to ransomware, as confirmed by the user of the client device 102, because the user has given the file a name associated with known ransomware. In another example, the learning engine 314 learns that a file that is encrypted and has a file name extension with a particular naming pattern (e.g., previously associated with existing ransomware) is likely affected by ransomware.

Based on the learning model, the learning engine 314 can, in one embodiment, suggest to the impacted file identification module 310 that the storage account is or is not likely affected by ransomware. In a further embodiment, the learning engine 314 updates a list of files that have been confirmed or validated as safe (non-impacted by ransomware) from the client device 102 or other client devices. All of the trends or patterns identified by the learning engine 314 may be stored in the data storage 206 and provided to the impacted file identification module 310 for further processing.

In other example embodiments, the learning engine 314 determines the number of files (in the account of the client device 102 in the data storage 206) being updated, deleted, created, and encrypted, and with suspicious extensions, and generates a determination or confidence level that the storage account is impacted by a malware or ransomware attack.

The client-side ransomware detection module 316 accesses results or notifications from a client-based ransomware application (not shown) operating at the client device 102. For example, the client-side ransomware detection module 316 receives a notification that a particular file corresponding to a file in the storage account has been flagged as a suspicious file. The client-side ransomware detection module 316 provides that notification to the impacted file identification module 310.

The impacted file identification module 310 receives the results from the file churn analysis module 303, the encryption analysis module 304, the file naming analysis module 306, the content analysis module 308, the learning engine 314, and the client-side ransomware detection module 316 to assess and determine whether the storage account is likely impacted by ransomware. In example embodiments, the impacted file identification module 310 provides a range of confidence that the storage account is impacted by ransomware. For example, the impacted file identification module 310 determines that the storage account is likely impacted by ransomware based on a determination that the file churn exceeds a preset churn rate (e.g., more than 10% of the files in the storage account have been modified within a short window of time—e.g., an hour), that a large number of files (e.g., larger than a preset number such as 10 files) are now encrypted and that their corresponding previous versions were not unencrypted, and that one or more files in the storage account have already been flagged by a client-based ransomware application at the client device 102.

Figure 4:
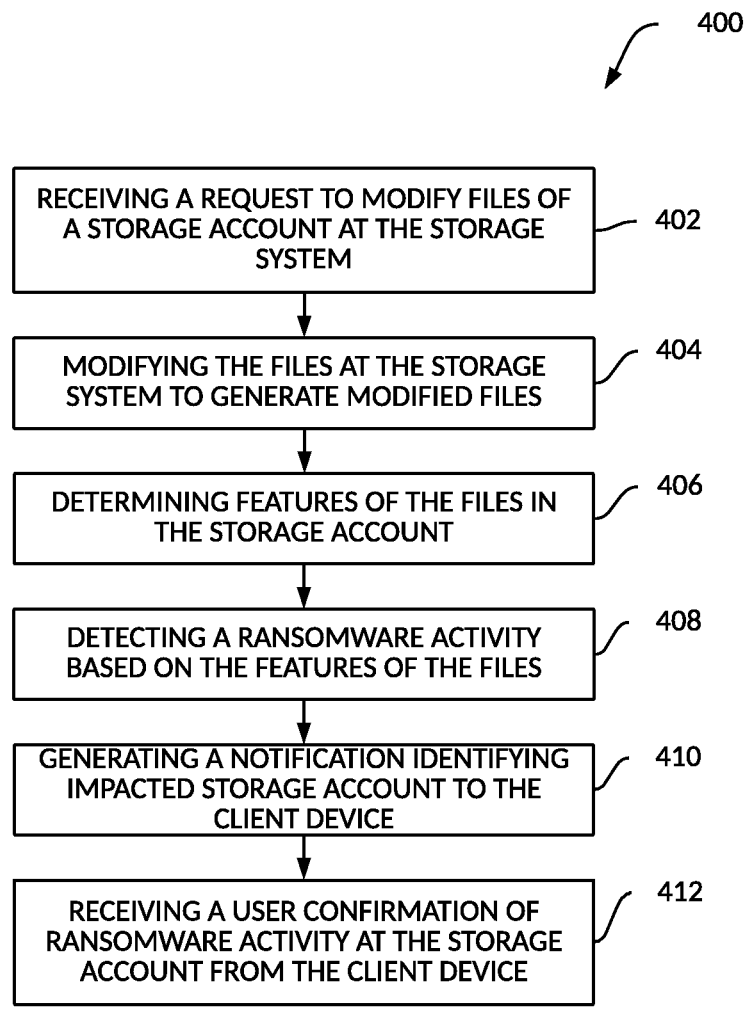
FIG. 4 is a flow diagram of a method for detecting ransomware activity in accordance with an example embodiment.

FIG. 4 is a flow diagram of a method 400 for detecting ransomware activity in accordance with an example embodiment. Operations in the method 400 may be performed by the storage system 106, using components (e.g., modules, engines) described above with respect to FIG. 2. Accordingly, the method 400 is described by way of example with reference to the storage system 106. However, it shall be appreciated that at least some of the operations of the method 400 may be deployed on various other hardware configurations or be performed by similar components residing elsewhere. For example, some of the operations may be performed at the client device 102.

In operation 402, the storage system 106 receives, from the client device 102, a request to modify files stored in the storage account of the client device 102 at the storage system 106. In other example embodiments, the request to modify files include modifying an existing file in the storage account in the storage system 106 or adding a new file to the storage account in the storage system 106. The storage system 106 receives the request via the server storage application 202 and the communication module 216.

In response to the request, in operation 404, the server storage application 202 accesses the user data structure (e.g., files, folder, directory) of the storage account of the client device 102 at the data storage 206 and stores the new file or modifies an existing file in the user data structure (to generate modified files).

In operation 406, the ransomware analysis engine 210 determines features of the files of the storage account. Examples of features include a file churn rate of files in the storage account, an encryption status of files in the storage account, a file or extension naming pattern, a content analysis matching result, and user feedback (e.g., previous feedback from the user of the client device 102 or users of other client devices) related to the files in the storage account (or other files in other storage accounts).

In operation 408, the ransomware analysis engine 210 detects ransomware (e.g., also referred to as "malware") activity based on the features of the files of the storage account.

In operation 410, the notification engine 214 generates a notification that identifies the storage account as being impacted by ransomware. The communication module 216 sends the notification to the client storage application 108.

In operation 412, the ransomware analysis engine 210 receives a confirmation of the ransomware activity at the storage account from the client storage application 108 via the communication module 216.

Figure 5:
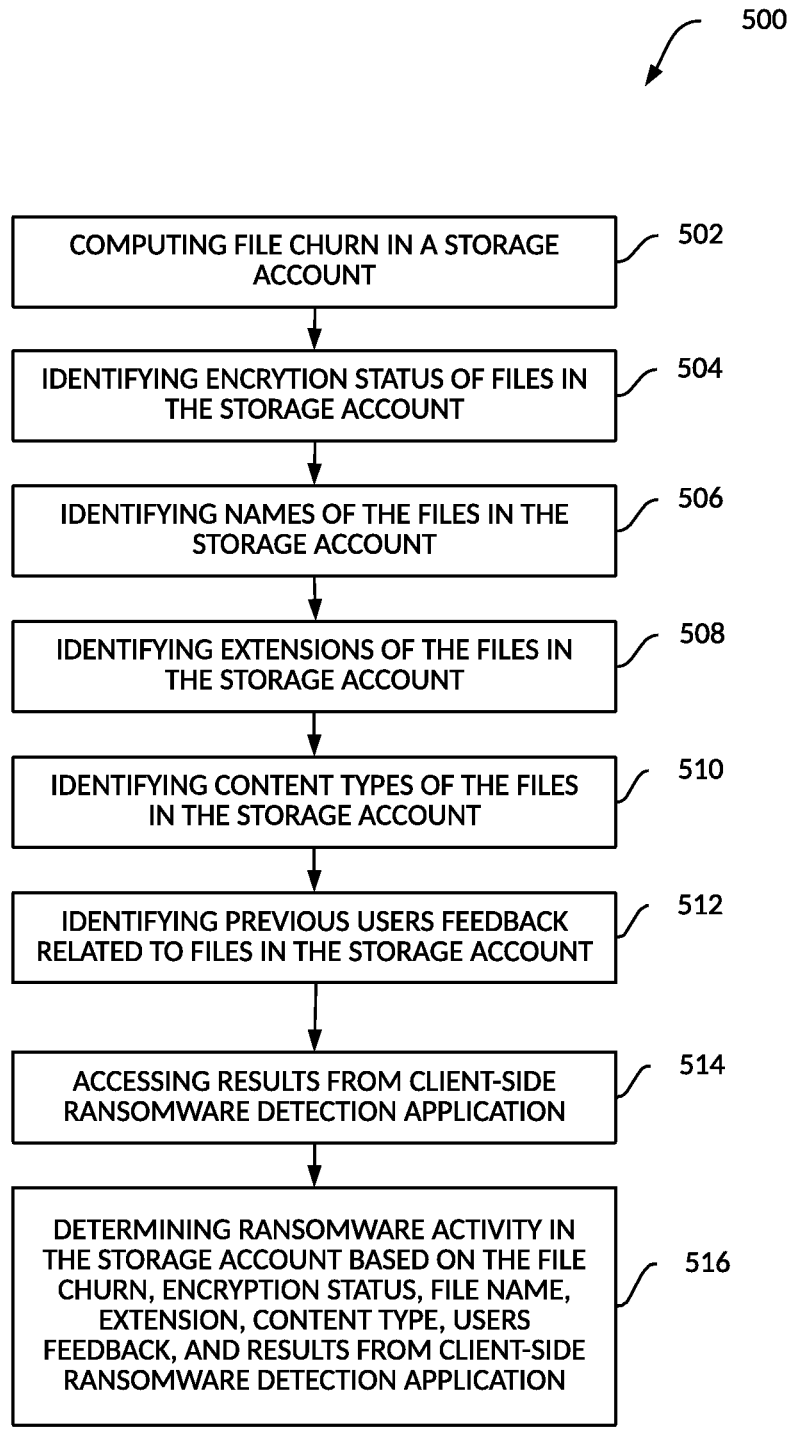
FIG. 5 is a flow diagram of a method for detecting ransomware activity in accordance with another example embodiment.

FIG. 5 is a flow diagram of a method 500 for detecting ransomware activity in accordance with another example embodiment. Operations in the method 500 may be performed by the ransomware analysis engine 210, using components (e.g., modules, engines) described above with respect to FIG. 3. Accordingly, the method 500 is described by way of example with reference to the ransomware analysis engine 210. However, it shall be appreciated that at least some of the operations of the method 500 may be deployed on various other hardware configurations or be performed by similar components residing elsewhere. For example, some of the operations may be performed at the client device 102.

In operation 502, the file churn analysis module 303 computes a file churn based on the number of file changes in a storage account during a predefined period of time. In one example embodiment, the ransomware analysis engine 210 determines whether the file churn exceeds a preset churn threshold for the predefined period of time (e.g., more than 50% of files have changed within a 24-hour period).

In operation 504, the encryption analysis module 304 identifies an encryption status of files in the storage account. For example, the encryption analysis module 304 determines how many files (that were not encrypted) are now encrypted. In another example embodiment, the encryption analysis module 304 determines how many files have become encrypted within a predefined period of time (e.g., the last 24 hours). In another example embodiment, the predefined period of time from the encryption analysis module 304 is the same as the predefined period of time from the file churn analysis module 303. In another example embodiment, the predefined period of time from the encryption analysis module 304 may be different in time duration and dates from the predefined period of time from the file churn analysis module 303.

In operation 506, the file naming analysis module 306 identifies file names of the files in the storage account.

In operation 508, the file naming analysis module 306 identifies file name extensions of files in the storage account.

In operation 510, the content analysis module 308 identifies a content type of the files in the storage account. For example, the content analysis module 308 determines whether the content of the files matches with the name extensions of the corresponding files.

In operation 512, the user feedback module 312 identifies previous user feedback related to the files in the storage account.

In operation 514, the client-side ransomware detection module 316 accesses the results of a client-based ransomware detection application operating at the client device 102.

In operation 516, the impacted file identification module 310 determines ransomware activity in the storage account based on the file churn, the encryption status, the file name, the extension, the content type, the previous user feedback, and results from the client-based ransomware detection application.

Figure 6:
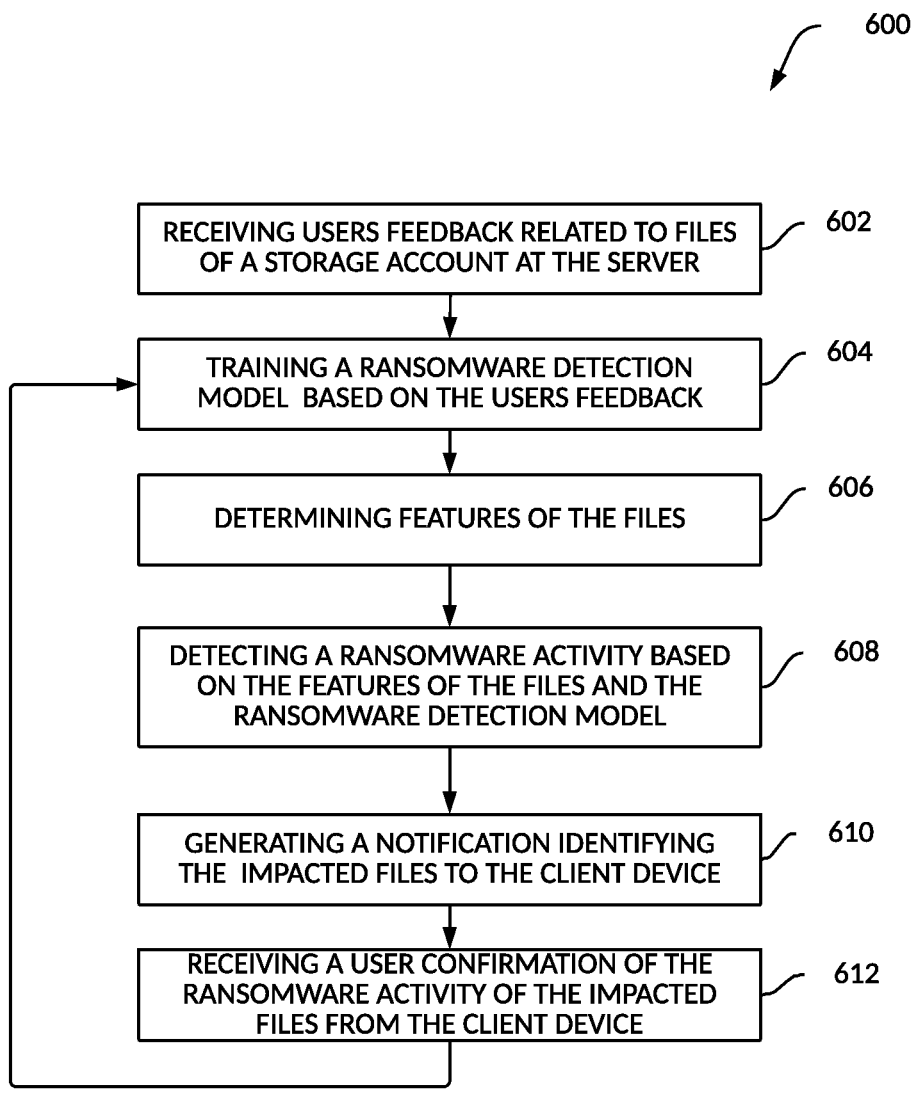
FIG. 6 is a flow diagram of a method for determining ransomware activity in a storage system in accordance with an example embodiment.

FIG. 6 is a flow diagram of a method 600 for determining ransomware activity in a storage system in accordance with another example embodiment. Operations in the method 600 may be performed by the ransomware analysis engine 210, using components (e.g., modules, engines) described above with respect to FIG. 3. Accordingly, the method 600 is described by way of example with reference to the ransomware analysis engine 210. However, it shall be appreciated that at least some of the operations of the method 600 may be deployed on various other hardware configurations or be performed by similar components residing elsewhere. For example, some of the operations may be performed at the client device 102.

In operation 602, the user feedback module 312 receives previous user feedback (or other users' feedback) related to the files of the storage account stored at the storage system 106.

In operation 604, the learning engine 314 trains a ransomware detection model for the storage account based on the user feedback.

In operation 606, the feature extraction module 302 determines features of the files in the storage account. Examples of features include a file churn, an encryption status, a file or extension naming pattern, a content analysis matching result, and user feedback related to files similar to files in the storage account.

In operation 608, the impacted file identification module 310 detects ransomware activity (e.g., ransomware) based on the features of the files in the storage account as previously determined in operation 606 and based on the ransomware detection model as previously determined in operation 604.

In operation 610, the notification engine 214 generates a notification that identifies the storage account and the impacted files in the storage account (based on the impacted file identification from operation 608) as potentially affected by ransomware to the client device 102. The communication module 216 sends the notification to the client storage application 108.

In operation 612, the user feedback module 312 receives a confirmation of the ransomware activity at the storage account from the client device 102 via the communication module 216. The user feedback module 312 receives the confirmation and provides the confirmation as training data to the learning engine 314.

Figure 7:
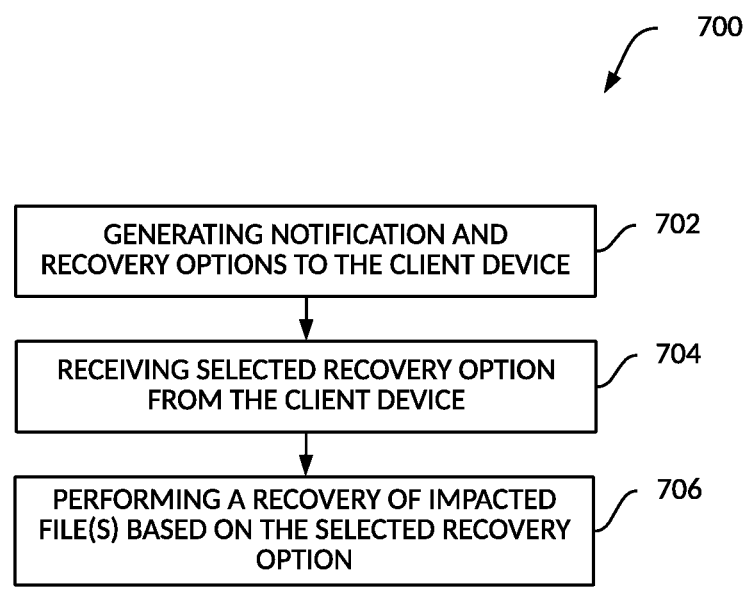
FIG. 7 is a flow diagram of a method for providing recovery options to remediate ransomware activity in an account of a storage system in accordance with an example embodiment.

FIG. 7 is a flow diagram of a method 700 for providing recovery options to remediate ransomware activity in an account of a storage system in accordance with an example embodiment. Operations in the method 700 may be performed by the storage system 106, using components (e.g., modules, engines) described above with respect to FIG. 2. Accordingly, the method 700 is described by way of example with reference to the storage system 106. However, it shall be appreciated that at least some of the operations of the method 700 may be deployed on various other hardware configurations or be performed by similar components residing elsewhere. For example, some of the operations may be performed at the client device 102.

In operation 702, the notification engine 214 generates the notification 215 to the client device 102. The notification 215 includes a detection notification that indicates that the storage account (or one or more files in the storage account) has been impacted by ransomware, and a remediation notification that provides recovery options to the user of the client device 102. The communication module 216 communicates the notification 215 to the client storage application 108.

In operation 704, the communication module 216 receives the selected recovery option from the client storage application 108. The communication module 216 provides the selected recovery option to the server storage application 202.

In operation 706, the server storage application 202 operates to remediate the storage account based on the selected recovery option, for example, by recovering previous versions (non-impacted versions) of the impacted files from the data storage 206.

Figure 8:
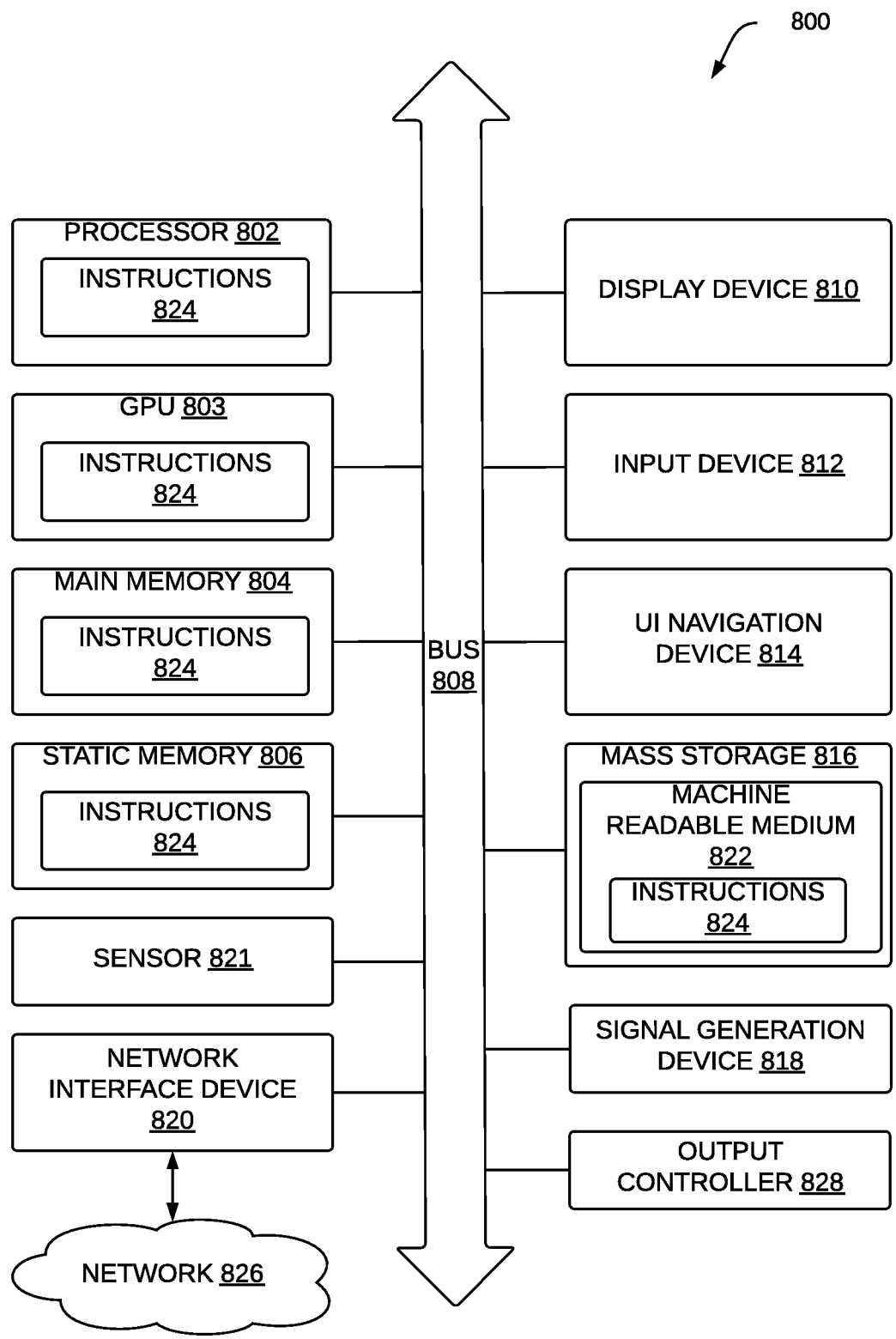
FIG. 8 is a diagrammatic representation of a machine in an example form of a computing system within which a set of instructions may be executed for causing the machine to perform any one or more of the methodologies discussed herein, according to an example embodiment.

FIG. 8 is a block diagram illustrating components of a machine 800, according to some example embodiments, able to read instructions 824 from a machine-storage medium 822 and perform any one or more of the methodologies discussed herein, in whole or in part. Specifically, FIG. 8 shows the machine 800 in the example form of a computer device (e.g., a computer) within which the instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flows and flow diagrams of FIGS. 4, 5, 6, and 7. The instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a power adapter, or any machine 800 capable of executing the instructions 824, sequentially or otherwise, that specify actions to be taken by that machine 800. Further, while only a single machine 800 is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU) 803, a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a display device 810 (e.g., a plasma display panel (PDP), a light-emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a user interface (UI) navigation device 814 (e.g., a mouse, a touchpad, a trackball, a joystick, a motion sensor, an eye tracking device, or another pointing instrument), a storage unit 816, a signal generation device 818 (e.g., a sound card, an amplifier, a speaker, a headphone jack, or any suitable combination thereof), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage unit 816 includes the machine-storage medium 822 on which are stored the instructions 824 embodying any one or more of the methodologies or functions described herein. The instructions 824 may also reside, completely or at least partially, within the processor 802, the GPU 803, main memory 804, the static memory 806, or the machine storage medium 822 before or during execution thereof by the machine 800. Accordingly, the main memory 804 and the processor 802 may be considered machine-storage media 822 (e.g., tangible and non-transitory machine-readable media).

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 804, 806, and/or the memory of the processor(s) 802) and/or the storage unit 816 may store one or more sets of instructions 824 and data structures (e.g., software) embodying or utilized by any one or more of the methodologies or functions described herein. These instructions, when executed by the processor(s) 802, cause various operations to implement the disclosed embodiments.

As used herein, the terms "machine-storage medium," "device-storage medium," and "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communication network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" or "signal medium" shall be taken to include any intangible medium that is capable of storing, encoding, or carrying the instructions 824 for execution by the machine 800, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated.

Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 822 or in a signal medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 802 or a group of processors 802) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a method for detecting ransomware in a storage account at a cloud server. The method comprises: determining features of files in a storage account of a cloud storage server, the storage account registered with a client device;
detecting ransomware activity based on the features of the files;
generating a notification to the client device in response to detecting the ransomware activity, the notification indicating the detected ransomware activity in the storage account, and one or more remediation options for the detected ransomware activity in the storage account;
receiving, from the client device, a remediation option selected from the one or more remediation options; and
recovering one or more files in the storage account based on the selected remediation option.

In example 2, the subject matter of example 1 can optionally include:
receiving, at the cloud storage server, a request from the client device to perform changes to one or more files in the storage account of the cloud storage server; and
performing the changes to the one or more files in the storage account of the cloud storage server prior to detecting the ransomware activity.

In example 3, the subject matter of example 1 can optionally include:

computing a file churn based on changes to one or more files in the storage account within a predefined period of time;
computing a number of files being encrypted within the predefined period of time;
identifying a name extension and a naming pattern for the one or more files in the storage account; and
identifying a content type for the one or more files in the storage account.

In example 4, the subject matter of example 3 can optionally include:
determining that the file churn exceeds a preset churn threshold;
determining that the number of files being encrypted within the predefined period of time exceeds a preset encrypted file number threshold;
determining that the name extension or the naming pattern for the one or more files in the storage account corresponds to a name extension or a naming pattern associated with known ransomware; and
determining that the content type for the one or more files in the storage account does not match corresponding content for the one or more files.

In example 5, the subject matter of example 1 can optionally include:
generating a request to the client device in response to detecting the ransomware activity in the storage account, the request including a request to confirm a presence of the ransomware activity in the storage account;
receiving, from the client device, a ransomware confirmation in response to the request, the ransomware confirmation indicating a confirmation of the presence or an absence of the ransomware activity in the storage account; and
training a machine learning system of the cloud storage server with the ransomware confirmation, the machine learning system configured to identify ransomware activity in the storage account of the cloud storage server.

In example 6, the subject matter of example 1 can optionally include wherein detecting the ransomware activity is based on a client-based malware notification from a client-based malware application operating at the client device.

In example 7, the subject matter of example 1 can optionally include wherein detecting the ransomware activity is based on a second ransomware confirmation from a second client device, the second ransomware confirmation indicating a confirmation of a presence of ransomware activity in files stored in a second storage account associated with the second client device in the cloud storage server.

In example 8, the subject matter of example 7 can optionally include wherein the files in the second storage account share similar features with the files in the storage account.

In example 9, the subject matter of example 8 can optionally include wherein the file churn of the storage account is at least equal to a file churn in the second storage account, wherein the number of files being encrypted in the storage account within the predefined period of time is at least equal to a number of files being encrypted in the second storage account within the predefined period of time, wherein the name extension and the naming pattern for the one or more files in the storage account are the same as a name extension and a naming pattern for one or more files in the second storage account.

In example 10, the subject matter of example 1 can optionally include wherein the one or more remediation options comprise recovering the one or more files to a version associated with one of a plurality of recovery times prior to a detection time of the ransomware activity, and recovering the one or more files from a recycle bin of the storage account.

Example 11 is a system for detecting ransomware in a storage of a server. The system includes one or more hardware processors; and a memory storing instructions that, when executed by the one or more hardware processors, cause the one or more hardware processors to perform operations comprising:
determining features of files in a storage account of a cloud storage server, the storage account registered with a client device;
detecting ransomware activity based on the features of the files;
generating a notification to the client device in response to detecting the ransomware activity, the notification indicating the detected ransomware activity in the storage account, and one or more remediation options for the detected ransomware activity in the storage account;
receiving, from the client device, a remediation option selected from the one or more remediation options; and
recovering one or more files in the storage account based on the selected remediation option.

In example 12, the subject matter of example 11 can optionally include wherein the operations further comprise:
receiving, at the cloud storage server, a request from the client device to perform changes to one or more files in the storage account of the cloud storage server; and
performing the changes to the one or more files in the storage account of the cloud storage server prior to detecting the ransomware activity.

In example 13, the subject matter of example 11 can optionally include wherein determining the features of the files comprises:
computing a file churn based on changes to one or more files in the storage account within a predefined period of time;
computing a number of files being encrypted within the predefined period of time;
identifying a name extension and a naming pattern for the one or more files in the storage account; and
identifying a content type for the one or more files in the storage account.

In example 14, the subject matter of example 13 can optionally include wherein detecting the ransomware activity comprises:
determining that the file churn exceeds a preset churn threshold;
determining that the number of files being encrypted within the predefined period of time exceeds a preset encrypted file number threshold;
determining that the name extension or the naming pattern for the one or more files in the storage account corresponds to a name extension or a naming pattern associated with known ransomware; and
determining that the content type for the one or more files in the storage account does not match corresponding content for the one or more files.

In example 15, the subject matter of example 11 can optionally include wherein the operations further comprise:
generating a request to the client device in response to detecting the ransomware activity in the storage account, the request including a request to confirm a presence of the ransomware activity in the storage account;
receiving, from the client device, a ransomware confirmation in response to the request, the ransomware confirmation indicating a confirmation of the presence or an absence of the ransomware activity in the storage account; and training a machine learning system of the cloud storage server with the ransomware confirmation, the machine learning system configured to identify ransomware activity in the storage account of the cloud storage server.

In example 16, the subject matter of example 11 can optionally include wherein detecting the ransomware activity is based on a client-based malware notification from a client-based malware application operating at the client device.

In example 17, the subject matter of example 11 can optionally include wherein detecting the ransomware activity is based on a second ransomware confirmation from a second client device, the second ransomware confirmation indicating a confirmation of a presence of ransomware activity in files stored in a second storage account associated with the second client device in the cloud storage server.

In example 18, the subject matter of example 17 can optionally include wherein the file churn of the storage account is at least equal to a file churn in the second storage account, wherein the number of files being encrypted in the storage account within the predefined period of time is at least equal to a number of files being encrypted in the second storage account within the predefined period of time, wherein the name extension and the naming pattern for the one or more files in the storage account are the same as a name extension and a naming pattern for one or more files in the second storage account.

In example 19, the subject matter of example 11 can optionally include wherein the one or more remediation options comprise recovering the one or more files to a version associated with one of a plurality of recovery times prior to a detection time of the ransomware activity, and recovering the one or more files from a recycle bin of the storage account.

Example 20 is a machine-storage medium storing instructions that, when executed by one or more processors of a machine, cause the one or more processors to perform operations comprising:
determining features of files in a storage account of a cloud storage server, the storage account registered with a client device;
detecting ransomware activity based on the features of the files;
generating a notification to the client device in response to detecting the ransomware activity, the notification indicating the detected ransomware activity in the storage account, and one or more remediation options for the detected ransomware activity in the storage account;
receiving, from the client device, a remediation option selected from the one or more remediation options; and
recovering one or more files in the storage account based on the selected remediation option.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method comprising:
   determining features of files in a storage account of a cloud storage server, the storage account registered with a client device;
   detecting ransomware activity based on the features of the files;
   generating a notification to the client device in response to detecting the ransomware activity, the notification indicating the detected ransomware activity in the storage account, and one or more remediation options for the detected ransomware activity in the storage account;
   receiving, from the client device, a remediation option selected from the one or more remediation options;
   recovering one or more files in the storage account based on the selected remediation option;
   receiving, at the cloud storage server, a request from the client device to perform changes to one or more files in the storage account of the cloud storage server; and
   prior to detecting the ransomware activity, completing the requested changes to the one or more files in the storage account of the cloud storage server.

2. The computer-implemented method of claim 1, wherein the ransomware activity is detected based on the features of the changed files after the cloud storage server performs the changes to the one or more files.

3. The computer-implemented method of claim 1, wherein determining the features of the files comprises:
   computing a file churn based on changes to one or more files in the storage account within a predefined period of time;
   computing a number of files being encrypted within the predefined period of time;
   identifying a name extension and a naming pattern for the one or more files in the storage account; and
   identifying a content type for the one or more files in the storage account.

4. The computer-implemented method of claim 3, wherein detecting the ransomware activity further comprises:

determining that the file churn exceeds a preset churn threshold;

determining that the number of files being encrypted within the predefined period of time exceeds a preset encrypted file number threshold;

determining that the name extension or the naming pattern for the one or more files in the storage account corresponds to a name extension or a naming pattern associated with known ransomware; and determining that the content type for the one or more files in the storage account does not match corresponding content for the one or more files.

5. The computer-implemented method of claim 1, further comprising:

generating a request to the client device in response to detecting the ransomware activity in the storage account, the request including a request to confirm a presence of the ransomware activity in the storage account;

receiving, from the client device, a ransomware confirmation in response to the request, the ransomware confirmation indicating a confirmation of the presence or an absence of the ransomware activity in the storage account; and training a machine learning system of the cloud storage server with the ransomware confirmation, the machine learning system configured to identify ransomware activity in the storage account of the cloud storage server.

6. The computer-implemented method of claim 1, wherein detecting the ransomware activity is based on a client-based malware notification from a client-based malware application operating at the client device.

7. The computer-implemented method of claim 3, wherein detecting the ransomware activity is based on a second ransomware confirmation from a second client device, the second ransomware confirmation indicating a confirmation of a presence of ransomware activity in files stored in a second storage account associated with the second client device in the cloud storage server.

8. The computer-implemented method of claim 7, wherein the files in the second storage account share similar features with the files in the storage account.

9. The computer-implemented method of claim 8, wherein the file churn of the storage account is at least equal to a file churn in the second storage account, wherein the number of files being encrypted in the storage account within the predefined period of time is at least equal to a number of files being encrypted in the second storage account within the predefined period of time, wherein the name extension and the naming pattern for the one or more files in the storage account are the same as a name extension and a naming pattern for one or more files in the second storage account.

10. The computer-implemented method of claim 1, wherein the one or more remediation options comprise recovering the one or more files to a version associated with one of a plurality of recovery times prior to a detection time of the ransomware activity, and recovering the one or more files from a recycle bin of the storage account.

11. A system comprising:
one or more hardware processors; and
a memory storing instructions that, when executed by the one or more hardware processors, cause the one or more hardware processors to perform operations comprising:

determining features of files in a storage account of a cloud storage server, the storage account registered with a client device;

detecting ransomware activity based on the features of the files;

generating a notification to the client device in response to detecting the ransomware activity, the notification indicating the detected ransomware activity in the storage account, and one or more remediation options for the detected ransomware activity in the storage account;

receiving, from the client device, a remediation option selected from the one or more remediation options;

recovering one or more files in the storage account based on the selected remediation option;

receiving, at the cloud storage server, a request from the client device to perform changes to one or more files in the storage account of the cloud storage server; and prior to detecting the ransomware activity, completing the requested changes to the one or more files in the storage account of the cloud storage server.

12. The system of claim 11, wherein the ransomware activity is detected based on the features of the changed files after the cloud storage server performs the changes to the one or more files.

13. The system of claim 11, wherein determining the features of the files comprises:

computing a file churn based on changes to one or more files in the storage account within a predefined period of time;

computing a number of files being encrypted within the predefined period of time;

identifying a name extension and a naming pattern for the one or more files in the storage account; and identifying a content type for the one or more files in the storage account.

14. The system of claim 13, wherein detecting the ransomware activity further comprises:

determining that the file churn exceeds a preset churn threshold;

determining that the number of files being encrypted within the predefined period of time exceeds a preset encrypted file number threshold;

determining that the name extension or the naming pattern for the one or more files in the storage account corresponds to a name extension or a naming pattern associated with known ransomware; and determining that the content type for the one or more files in the storage account does not match corresponding content for the one or more files.

15. The system of claim 11, wherein the operations further comprise:

generating a request to the client device in response to detecting the ransomware activity in the storage account, the request including a request to confirm a presence of the ransomware activity in the storage account;

receiving, from the client device, a ransomware confirmation in response to the request, the ransomware confirmation indicating a confirmation of the presence or an absence of the ransomware activity in the storage account; and training a machine learning system of the cloud storage server with the ransomware confirmation, the machine learning system configured to identify ransomware activity in the storage account of the cloud storage server.

16. The system of claim 11, wherein detecting the ransomware activity is based on a client-based malware notification from a client-based malware application operating at the client device.

17. The system of claim 13, wherein detecting the ransomware activity is based on a second ransomware confirmation from a second client device, the second ransomware confirmation indicating a confirmation of a presence of ransomware activity in files stored in a second storage account associated with the second client device in the cloud storage server.

18. The system of claim 17, wherein the file churn of the storage account is at least equal to a file churn in the second storage account, wherein the number of files being encrypted in the storage account within the predefined period of time is at least equal to a number of files being encrypted in the second storage account within the predefined period of time, wherein the name extension and the naming pattern for the one or more files in the storage account are the same as a name extension and a naming pattern for one or more files in the second storage account.

19. The system of claim 11, wherein the one or more remediation options comprise recovering the one or more files to a version associated with one of a plurality of recovery times prior to a detection time of the ransomware activity, and recovering the one or more files from a recycle bin of the storage account.

20. A non-transitory machine-storage medium storing instructions that, when executed by one or more processors of a machine, cause the one or more processors to perform operations comprising:
determining features of files in a storage account of a cloud storage server, the storage account registered with a client device;
detecting ransomware activity based on the features of the files;
generating a notification to the client device in response to detecting the ransomware activity, the notification indicating the detected ransomware activity in the storage account, and one or more remediation options for the detected ransomware activity in the storage account;
receiving, from the client device, a remediation option selected from the one or more remediation options;
recovering one or more files in the storage account based on the selected remediation option;
receiving, at the cloud storage server, a request from the client device to perform changes to one or more files in the storage account of the cloud storage server; and
prior to detecting the ransomware activity, completing the requested changes to the one or more files in the storage account of the cloud storage server.

* * * * *